Feb. 23, 1960          E. BAAS          2,925,893
METHOD OF PRODUCING A HOLLOW BEAM
Filed Sept. 7, 1955          2 Sheets-Sheet 1
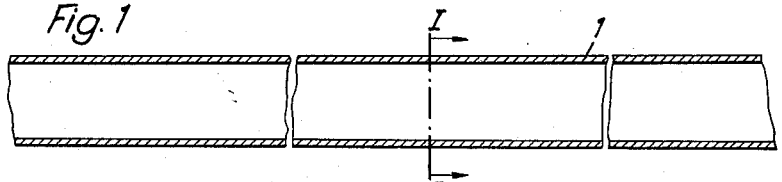
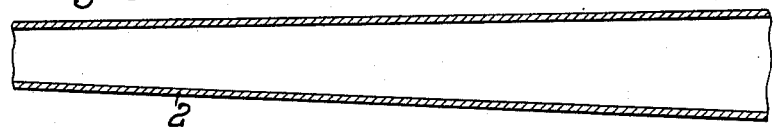
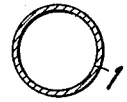
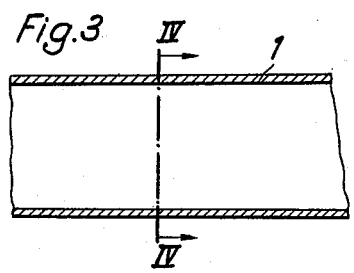
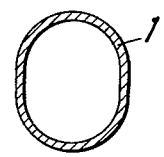
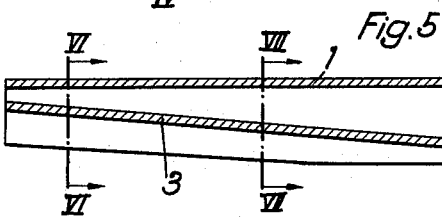
  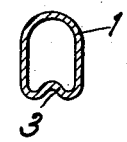

Feb. 23, 1960     E. BAAS     2,925,893
METHOD OF PRODUCING A HOLLOW BEAM
Filed Sept. 7, 1955     2 Sheets-Sheet 2

United States Patent Office 2,925,893
Patented Feb. 23, 1960

2,925,893
METHOD OF PRODUCING A HOLLOW BEAM
Erwin Baas, Hamburg-Hochkamp, Germany Application September 7, 1955, Serial No. 532,993

Claims priority, application Germany May 12, 1955

1 Claim. (Cl. 189—37)

The present invention relates to a method of producing a hollow beam.

It is difficult to design a beam so that its cross section at any point over its total length corresponds with the strain at any such point. If a beam of uniform cross section over its total length is used, its cross section must be dimensioned in such manner that the highest stress, which in most cases occurs at one point only, can be received. At all other points the beam is over-dimensioned.

It is one object of the present invention to provide a hollow beam which eliminates these deficiencies and the cross section of which over the total length of the beam corresponds with the respective stresses at any point. It is another object of the present invention to provide a hollow beam in which the zone of highest stress of the beam is pressed flat perpendicularly to the direction of strain to increase the moment of resistance, and in which the end of the beam which is a flat tube are folded to the inside towards the center. The beam produced in accordance with this method is formed of a hollow tube, pressed flat transversely to the direction of stresses exerted thereon and its ends are folded to the inside towards the center.

It is also another object of the present invention to provide a hollow bear which comprises a tube pressed flat at the points of highest stress, whereby the moment of resistance is increased, and which is folded at the beam ends, thereby providing material to form a beam restraint or a beam support or to secure any other structural elements to the beam ends. In this manner, the usual provision in a conventional hollow beam of a reinforcement of the beam ends by additional flanges or welded member is eliminated.

Furthermore, the beam ends may also be pressed flat. At the same time the outer appearance of the beam is improved by this design.

It is still a further object of the present invention to provide a hollow beam which is pressed flat at the point of highest stress and has folds at its ends and is made of a cylindrical or conical tubular member.

With these and other objects in view which will become apparent in the following detailed description, the present invention will be clearly understood in connection with the accompanying drawings, in which:

Figures 1 and 1a are longitudinal sectional views through a tube, as for instance, a steel tube, forming the beam;

Fig. 2 is a section along the lines I—I of Fig. 1;

Fig. 3 is a longitudinal sectional view of a shaped part in the center of the beam;

Fig. 4 is a section along the lines IV—IV of Fig. 3;

Fig. 5 is a longitudinal sectional view of a part of the beam end;

Fig. 6 is a section along the lines VI—VI of Fig. 5;

Fig. 7 is a section along the lines VII—VII of Fig. 5;

Fig. 8 is a section along the lines VIII—VIII of Fig. 5; and

Figure 9:
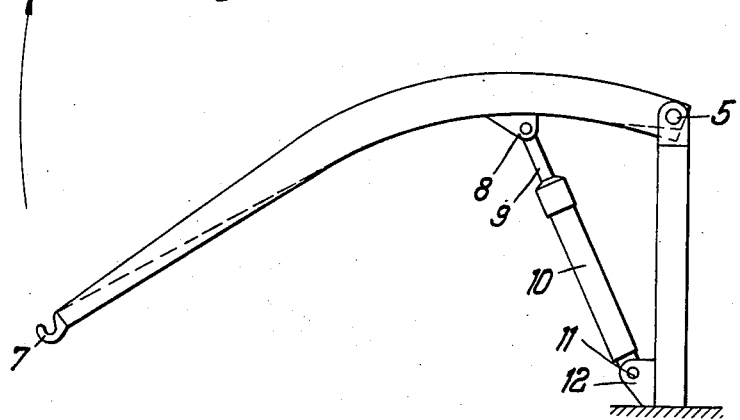
Fig. 9 is a side elevational view of a hoist provided with a beam in accordance with the present invention, showing a fold at both ends of the beam.

Referring now to the drawing, to produce a beam in accordance with the present invention, a hollow tube 1 is used generally, as shown in a longitudinal sectional view in Fig. 1 of cylindrical formation and in a cross section view in Fig. 2. The tube is of uniform diameter over its entire length in the embodiment shown in Figs. 1 and 2, however, a tapered or conical tube 2, as shown in Fig. 1a, may also be used which has diminishing diameter in one axial direction.

Generally, the center of the beams is subjected to highest stress. To increase the moment of resistance, the center part of the beam is pressed flat, as disclosed in Figs. 3 and 4. Such construction increases the distance between the utmost beam layer and the neutral axis. The moment of resistance with respect to bending stress is thus increased.

At the ends of the beams, however, it is necessary to have available as much material as possible for the journaling of the beam. The moment of resistance at these points need not be as great as in the zone of highest stress. For this reason the beam material is bent into a fold 3 (Fig. 6), directed to the inside so that the beam looks thinner at its ends. The fold 3 is directed towards the beam center, as can be seen from Figs. 5 to 8. The beam, of course, may, however, be pressed flat also at its ends. At the points of highest stress the beam is always pressed flat transversely to the direction of stress. From it ends towards the zone of high stress the beam is gradually folded (Fig. 5). The beam may be shaped in cold or hot condition. Folding, as well as the pressing of the beam ends may be made to a different extent, in accordance with the particular requirements.

While I have disclosed several embodiments of the present invention, it is to be understood that these embodiments are given by example only and not in a limiting sense, the scope of the present invention being determined by the objects and the claim.

I claim:

A hollow beam comprising a flattened hollow tube folded towards its longitudinal center line at both ends of said beam, said fold comprising two outer and two inner sheets disposed parallel to each other and to a vertical plane extending through said longitudinal center line of said beam, said inner sheets being arranged between said outer sheets, said inner sheets being connected at their bottom to said outer sheets and extending beyond the longitudinal center line of the cross-section of said beam at one of its ends, and said folds decreasing in depth towards a point intermediate the ends of said beam.

References Cited in the file of this patent
UNITED STATES PATENTS

| | | |
|---|---|---|
| 634,692 | Lanz | Oct. 10, 1899 |
| 910,192 | Grouvelle et al. | Jan. 19, 1909 |
| 1,081,077 | Wright | Dec. 9, 1913 |
| 2,227,436 | Buckwalter | Jan. 7, 1941 |
| 2,391,766 | Barnhart | Dec. 25, 1945 |
| 2,468,602 | Lord | Apr. 26, 1949 |
| 2,614,712 | Dingley | Oct. 21, 1952 |